United States Patent [19]

Godeau

[11] Patent Number: 5,464,256
[45] Date of Patent: Nov. 7, 1995

[54] PLATE AND AN ENDPIECE FOR A COUPLING DEVICE, A COUPLING DEVICE, AND A METHOD OF MAKING IT

[75] Inventor: Denis Godeau, Vieilles Maisons, France

[73] Assignee: Hutchinson, Paris, France

[21] Appl. No.: 101,968

[22] Filed: Aug. 4, 1993

[30] Foreign Application Priority Data

Aug. 12, 1992 [FR] France ................................. 92 09947

[51] Int. Cl.$^6$ ................................................. F16L 37/14
[52] U.S. Cl. ........................... 285/26; 285/137.1; 285/305; 285/62
[58] Field of Search ..................... 285/401, 402, 285/376, 62, 913, 914, 137.1, 305, 25, 26

[56] References Cited

U.S. PATENT DOCUMENTS

| | | | |
|---|---|---|---|
| 1,031,587 | 7/1912 | Reisik | 285/914 |
| 4,111,514 | 9/1978 | Brishka et al. | 285/914 |
| 4,619,640 | 10/1986 | Potolsky et al. | 285/914 |
| 4,753,268 | 6/1988 | Palau | 285/914 |
| 4,844,408 | 7/1989 | Beaston . | |
| 5,052,722 | 10/1991 | Kubo et al. | 285/62 |
| 5,071,169 | 12/1991 | Moscnet | 285/62 |
| 5,169,178 | 12/1992 | Hunzinger | 285/62 |
| 5,209,523 | 5/1993 | Godeau | 285/93 |
| 5,219,185 | 6/1993 | Oddenino | 285/137.1 |
| 5,228,724 | 7/1993 | Godeau | 285/93 |
| 5,271,646 | 12/1993 | Allread et al. | 285/137.1 |
| 5,332,268 | 7/1994 | Godeau | 285/93 |

FOREIGN PATENT DOCUMENTS

| | | | |
|---|---|---|---|
| 571247 | 11/1993 | European Pat. Off. | 285/137.1 |
| 2308856 | 11/1976 | France . | |
| 2357809 | 2/1978 | France . | |
| 2669711 | 5/1992 | France . | |
| 1187435 | 2/1965 | Germany | 285/914 |
| 4037308 | 4/1992 | Germany . | |
| 611730 | 10/1960 | Italy | 285/914 |
| 771968 | 4/1957 | United Kingdom | 285/914 |

*Primary Examiner*—Eric K. Nicholson
*Attorney, Agent, or Firm*—Bell, Seltzer, Park & Gibson

[57] ABSTRACT

The present invention relates to a coupling plate for coupling an endpiece to a fluid circuit. The plate includes at least one body in which an opening is formed to receive an endpiece of a tubular duct, and means for preventing said endpiece rotating about its own axis in a plurality of predetermined orientations.

10 Claims, 4 Drawing Sheets

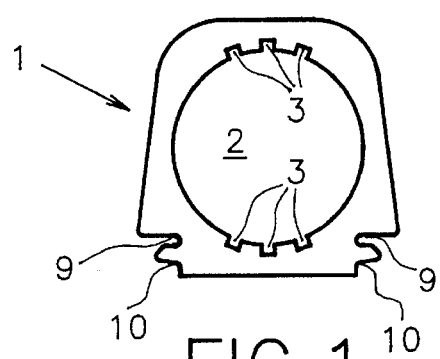
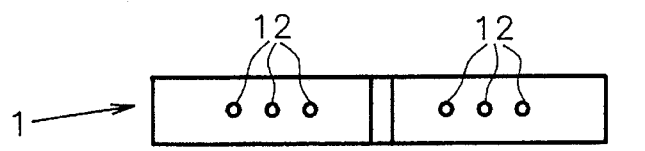
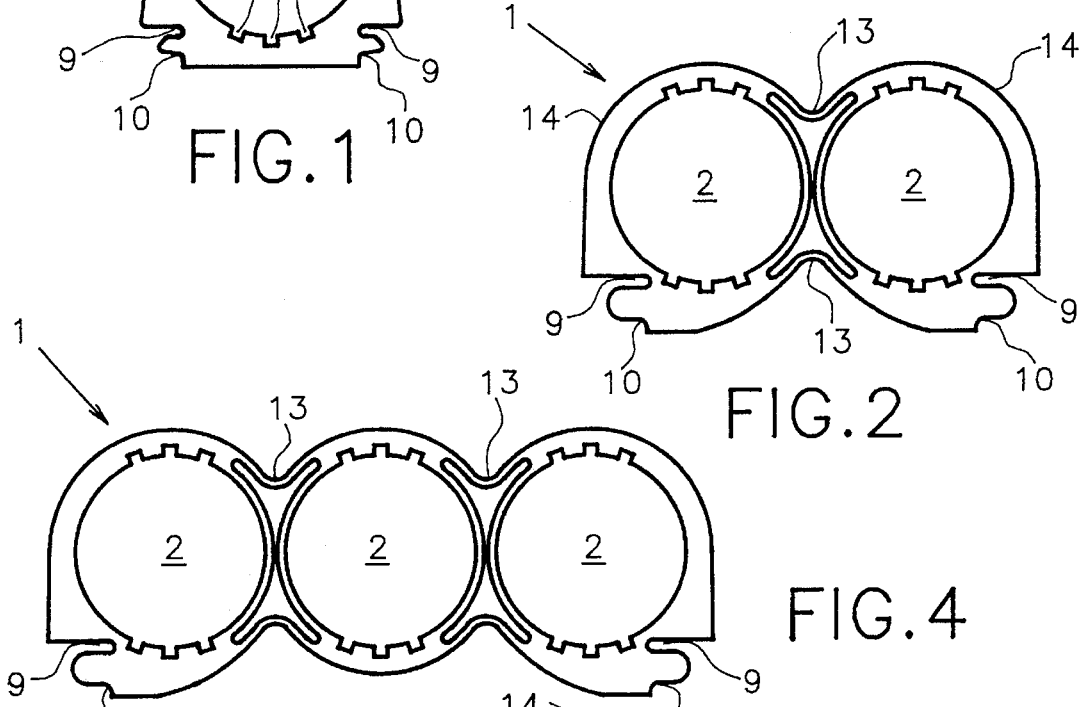
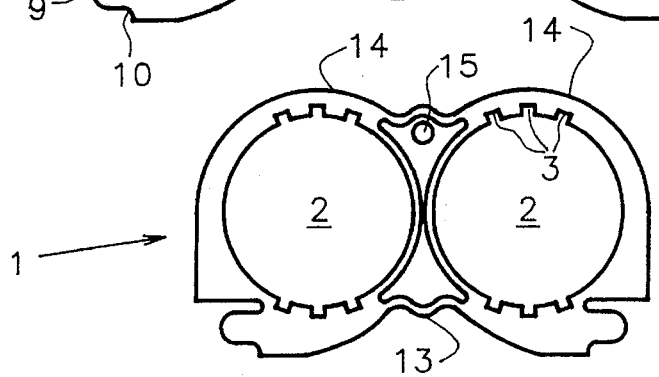
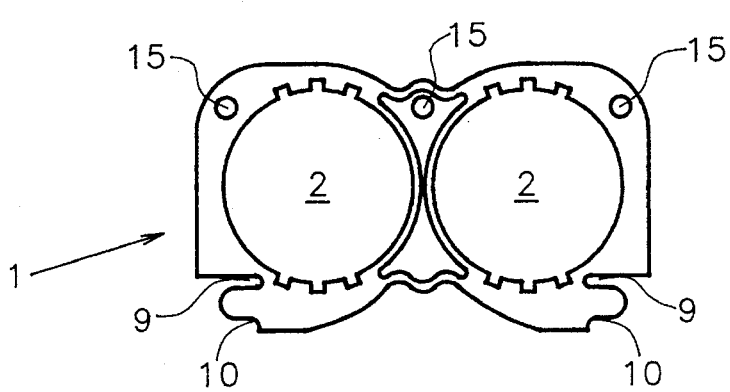

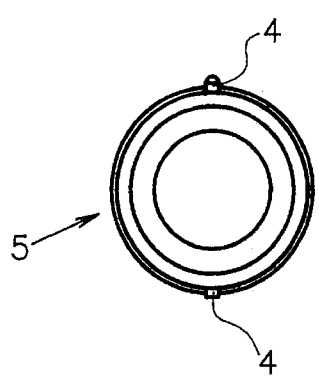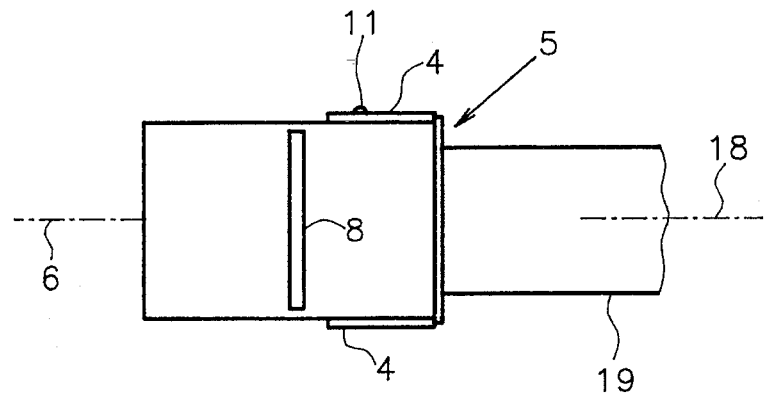
FIG. 9　　FIG. 8
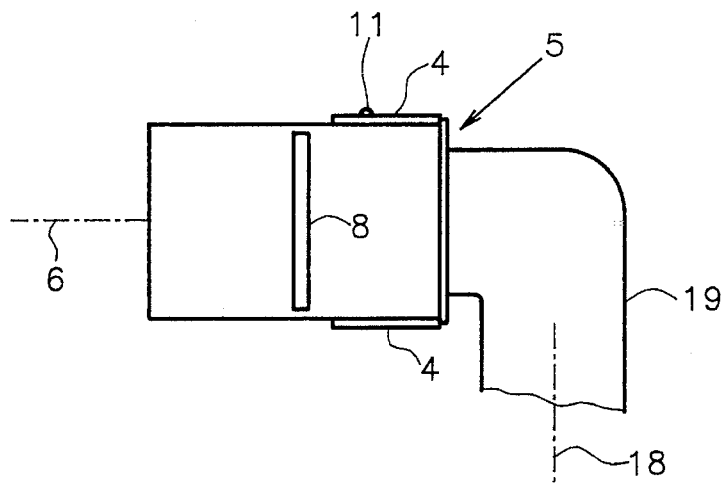
FIG. 10
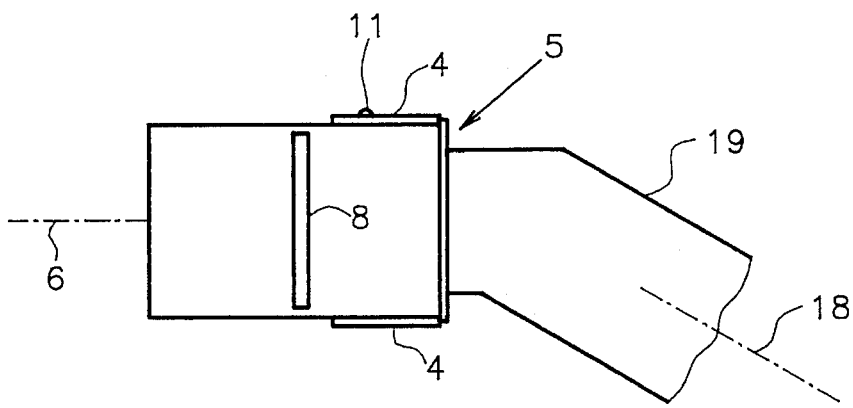
FIG. 11

PLATE AND AN ENDPIECE FOR A COUPLING DEVICE, A COUPLING DEVICE, AND A METHOD OF MAKING IT

The present invention relates mainly to a plate and to an endpiece for a coupling device for coupling tubular ducts, in particular for the internal combustion engine of a motor vehicle.

BACKGROUND OF THE INVENTION

A motor vehicle engine, and in particular a gasoline engine, includes numerous fluid circuits. These circuits include elements that need interconnecting in sealed manner. It is essential for said sealing to be ensured throughout the lifetime of the engine, even under severe conditions of use, given that any leakage from a fluid circuit of an internal combustion engine in a motor vehicle runs the risk of damaging to the engine that is in a manner difficult to repair.

Thus, for reasons of reliability, car manufacturers have adopted rapid connectors for modern engines that enable sealing to be guaranteed for the fluid circuits. In addition, it is easy for robots to connect rapid connectors together.

However, consumers look for vehicles having maximum passenger space for minimum vehicle size and manufacturers therefore attempt to reduce the amount of space that the engine occupies in a vehicle by making use of fluid circuits that are complex in shape, thereby enabling them to make the most of the space available.

As a result, coupling devices for tubular ducts, and in particular for water pipes in a cooling circuit, need to be adapted to a particular shape and location of an engine, thereby making it necessary for each vehicle, or at least for each engine to develop special tooling, and in particular a special mold for molding an insert of plastics material suitable for mounting on the end of a tubular duct that is typically made of elastomer.

Although French patent application FR 2 669 771 discloses a multi-duct coupling for securing ducts implementing pieces that are interconnected by a flexible support, such a coupling cannot achieve the accuracy required of a device whose configuration is exactly matched to the configuration of the engine. Furthermore, that document does not suggest the possibility of using endpieces that are angled and that have angle-members pointing in accurate directions depending on the desired configuration.

OBJECTS AND SUMMARY OF THE INVENTION

Consequently, an object of the present invention is to provide a rapid coupling device suitable for being adapted to various engine configurations.

Another object of the present invention is to provide such a device which is suitable for being assembled from a small number of pieces.

Another object of the present invention is to provide such a device that enables accurate coupling to be performed.

Another object of the present invention is to provide such a device that enables reliable connection to be achieved while accepting large manufacturing tolerances.

Another object of the present invention is to provide such a device that enables connection to be performed rapidly and reliably.

Finally, another object of the present invention is to provide such a connection device that enables a large number of tubular ducts to be grouped together.

These objects are achieved by implementing modular elements suitable for being assembled together in various different ways, and adapted to various different engine configurations.

The invention mainly provides a coupling plate for at least one endpiece of a fluid circuit of an internal combustion engine, including at least one body having an opening formed therein to receive an endpiece of a tubular duct and rotary locking means for locking said endpiece against rotation about its own axis in a plurality of predetermined orientations.

The invention also provides a plate wherein the means for locking the endpiece against rotation about its own axis in a plurality of predetermined orientations include grooves for receiving a rib on the endpiece.

The invention also provides a plate wherein it includes two openings for receiving two endpieces.

The invention also provides a plate wherein it includes semi-rigid or flexible link means interconnecting the bodies in which the openings for receiving respective endpieces are formed.

The invention also provides a plate as defined above including means for locking endpieces disposed in the openings, in particular recesses or openings for receiving projections formed on the endpieces.

According to another characteristic of the invention, the plate includes a notch for receiving the ends of a pin for locking the coupling device.

The invention also provides an endpiece, in particular an angled endpiece, suitable for being assembled to a plate as defined above including locking means for co-operating with the rotary locking means of the plate to provide locking against rotation about the axis in predetermined orientations.

The invention also provides a coupling device for coupling tubular ducts to a fluid circuit of an internal combustion engine, in particular to the water pipes of a cooling circuit, including a plate of the invention and at least one, and preferably two, endpiece(s) of the invention prevented from rotating about their respective axes, in any one of the predetermined orientations.

The invention also provides a method of manufacturing a device for coupling tubular ducts to a fluid circuit of an internal combustion engine, including a step of inserting at least one angled endpiece having a desired predetermined orientation relative to its own axis into a reception opening of a plate.

The invention also provides such a method, including a prior step of determining the shape and the orientation of the endpiece that are optimally adapted to the configuration of an engine, and a step consisting in selecting the predetermined configuration that is the closest possible to said optimally adapted configuration.

BRIEF DESCRIPTION OF THE DRAWINGS

The invention will be better understood from the following description and from the accompanying drawings given by way of non-limiting example, and in which:

FIG. 1 is a front elevation view with a first embodiment of a plate of the present invention;

FIG. 2 is a front elevation view of a second embodiment of a plate of the present invention;

FIG. 3 is a plan view of the FIG. 2 plate;

FIG. 4 is a front elevation view of a third embodiment of a plate of the present invention;

FIG. 5 is a front elevation view of a fourth embodiment of a plate of the present invention;

FIG. 6 is a front elevation view of a fifth embodiment of a plate of the present invention;

FIG. 8 is a side elevation view of a first embodiment of an endpiece of the present invention;

FIG. 9 is a front elevation view of the FIG. 8 endpiece;

FIG. 10 is a side elevation view of a second embodiment of an endpiece of the present invention;

FIG. 11 is a side elevation view of a third embodiment of an endpiece of the present invention;

MORE DETAILED DESCRIPTION

Figure 7:
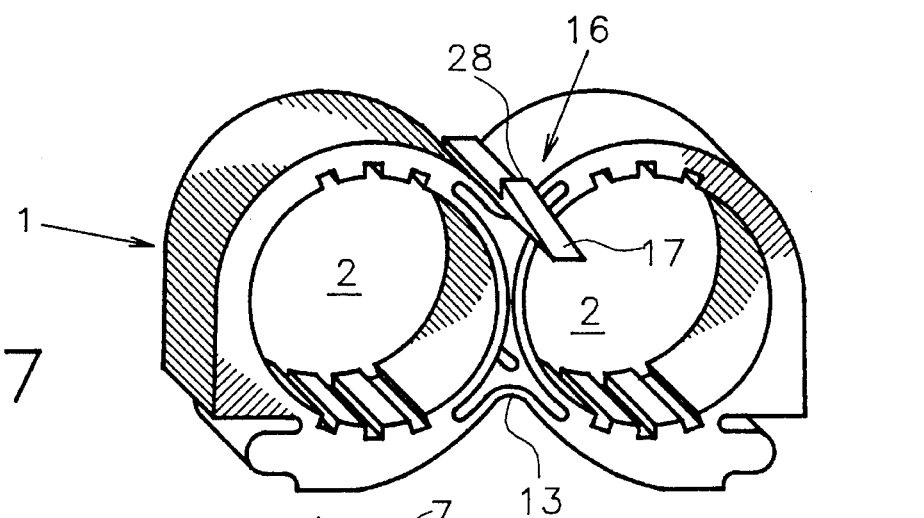
FIG. 7 is a perspective view of a sixth embodiment of a plate of the present invention.

In FIGS. 1 to 15, the same references are used to designate the same elements.

In FIGS. 1 to 7, there can be seen plates 1 of the present invention each including at least one opening 2 for receiving an endpiece, means 3 for preventing the endpiece rotating about its own axis and for holding it in a plurality of predetermined orientations relative to the plate 1, and advantageously means for fixing the plate fitted with one or more endpieces to a fluid circuit, in particular a cooling circuit for an internal combustion engine in a motor vehicle.

Without being limiting in any way, the means for preventing rotation in the illustrated embodiments of the devices of the present invention all comprise a plurality of grooves 3 for receiving a rib 4 on any of the endpieces 5 shown in FIGS. 8 to 11. When assembled together, the ribs 4 and the grooves 3 are parallel to an axis 6 of the corresponding endpiece 5. In the embodiments shown, each endpiece 5 includes two diametrically opposite ribs 4, while each opening 2 for receiving an endpiece 5 in each plate 1 has three pairs of diametrically opposite grooves.

Advantageously, the device of the invention is locked onto a fluid circuit of an engine by means of a pin 7 (shown in FIGS. 12 and 13) that engages in through openings or notches 8 formed in the endpieces 5 and in a notch received in the endpieces of a fluid circuit of the engine (not shown). Advantageously, during coupling, the pin 7 is splayed apart by ramps, e.g. frustoconical ramps, formed in the endpieces of the fluid circuit and adjacent to said notches, thereby enabling the endpieces 5 to be locked by being moved in translation along the axes 6 towards the endpieces of the fluid circuit.

Advantageously, as described in French patent application FR 92 06195 (not yet published on the application date of the present application), prior to assembly, the pin occupies a first position in the immediate vicinity of the tubular ducts, and after coupling has been performed it occupies a second position further away from the tubular ducts, thereby making it possible to see by visual inspection when the fluid circuit has been coupled together properly. The examples of the plate 1 of the present invention as shown in FIGS. 1, 2, and 4 to 6 include notches 9 for receiving the ends of the pin 7 in said second position, and shoulders 10 for receiving the ends of the pin 7 in said first position.

Devices of the invention preferably include means for locking the endpieces 5 in the plates 1 so as to prevent disassembly of a coupling device that has a desired configuration, and thus preventing said configuration being, accidentally, re-assembled wrongly. Furthermore, as explained below, for plates that receive a plurality of tubular duct endpieces, it is possible for some of the endpieces 5 not to be locked to the corresponding endpieces of the fluid circuit of the engine.

For example, the means for locking the endpieces in the plates may include a projection 11 carried on each endpiece 5 and openings or recesses 12 (FIG. 3) in the plates 1 for receiving said projections. The endpieces 5 are inserted as a force-fit in the openings 2.

In FIG. 1, there can be seen a first embodiment of a plate 1 of the present invention that includes a single opening 2 for receiving an endpiece 5, said plate 1 including a notch 9 and a shoulder 10 for manipulating the pin 7 while locking to a fluid circuit of an engine.

Three pairs of diametrically opposite rectangular-section grooves 3 are formed in the opening 2 of the plate 1 to enable one of the angled endpieces 5 of FIGS. 10 and 11 to be inserted in the opening 2 in any one of six different orientations.

Naturally, the number, shape, and disposition of the grooves 3 is not limiting in any way. For example, without going beyond the ambit of the present invention, it would be possible to use a single rib 5 for each predetermined orientation of an associated endpiece where the endpieces 5 have only one rib 4, it will be possible to use a number of grooves or pairs of grooves 3 equal to 2, 4, 5, or more, and it would be possible to use grooves of triangular or other section.

Similarly, using a plate as shown in FIG. 1 that includes an integrated endpiece would not go beyond the ambit of the present invention.

In FIG. 2, there can be seen a plate of the present invention that includes two openings 2 for receiving endpieces 5, the openings being of a configuration that is substantially identical to the opening of the plate 1 in FIG. 1. The plate 1 also includes arcuate link elements 13 linking together bodies 14 that define the openings 2. Advantageously, the link elements 13 are sufficiently flexible to enable an error in the spacing between the endpieces 5 relative to the spacing between the endpieces of the fluid circuit of the engine to be accommodated by the link elements deforming. For example, the plate 1 may be provided with two arcuate link elements 13 disposed top and bottom as shown, having their convex faces directed towards the plate, or on the contrary having facing concave faces.

In FIG. 4, there can be seen a plate 1 of the present invention in which three openings 2 are provided for receiving a line of endpieces 5. Under such circumstances, the endpieces placed in the end openings 2 are locked in place by the pin 7. The central endpiece may include its own specific locking means and/or it may be held in place by the plate 1.

Naturally, the ambit of the present invention extends to plates 1 that include a larger number of openings 2 for receiving endpieces, which openings may be placed in line, in a triangular configuration, or in any other disposition.

In FIG. 5, there can be seen a plate 1 of the present invention that is substantially identical to the plate 1 of FIG. 2 and that includes an element fixed in the inside space between the two bodies 14 and having an opening 15 formed therein for passing a small diameter tubular duct or for receiving an endpiece for such a tubular duct.

In FIG. 6 there can be seen a plate 1 of the present invention having two openings 2 for receiving an endpiece 5 as shown in FIGS. 8 to 11, together with three through openings 15 for passing small diameter tubular ducts or for receiving the endpieces of such ducts. Naturally, such ducts or such endpieces should not prevent locking means for the device of the present invention operating properly, in particular should not impede operation of the pin 7.

Naturally, the invention is not limited to the device of the present invention being locked by implementing a pin 7. In FIG. 7, there can be seen a plate 1 of the present invention including a snap-fastening locking device 16 comprising a ramp 17 terminated by a catch shoulder 28. The device 17 penetrates into an opening (not shown) that is secured to the engine and thus locks the plate 1 thereto. Advantageously, the locking means 16 include release means (not shown).

In FIGS. 8 and 9, there can be seen an embodiment of a rectilinear endpiece 5, in other words when at rest the axis 18 of the tubular duct 19 is in alignment with the axis 6 of the endpiece 5. Naturally, it is advantageous to use flexible tubular ducts (hoses) suitable under stress for taking up some other configuration.

It should be observed that rotating the endpiece 5 about the axis 6 does not change the general shape of the device of the present invention. However, like the endpieces of FIGS. 10 and 11, such rotation must not prevent the device being locked. For example, through openings or notches 8 must be located in positions allowing the pin 7 to pass. It may be advantageous to provide each endpiece 5 of the present invention with a plurality of notches 8 so as to enable the device of the present invention to be locked independently of the configuration and of the orientation of the endpieces 5 in the plates 1.

In FIG. 10, there can be seen an angled endpiece which at rest has a right angle between the axis 6 of the endpiece 5 and the axis 18 of the tubular duct 19.

In FIG. 11, there can be seen an angled endpiece 5 whose axes 6 and 18 form an obtuse angle.

Starting with a limited number of basic elements, rotating the endpieces 10 or 11 about their axes 6 makes it possible to adapt coupling devices of the present invention to the particular configuration of a given engine, for example. Advantageously, the configuration used is the available configuration that is nearest to the optimum configuration. Likewise, it is possible to make up a coupling device of the present invention by disposing two different endpieces in the same plate. For example, the plate 1 of FIG. 2 could receive an endpiece 5 of FIG. 8 together with an endpiece 5 of FIG. 10 or of FIG. 11. The most common adaptations are shown in FIGS. 12 and 13.

Figure 12:
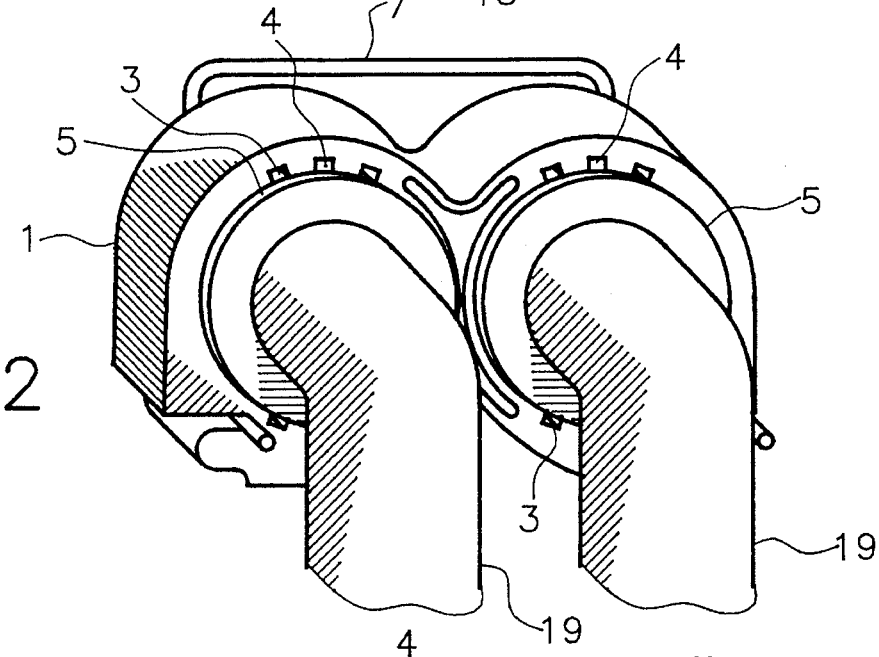
FIG. 12 is a diagrammatic perspective view of a connection device of the present invention in a first configuration.
Figure 13:
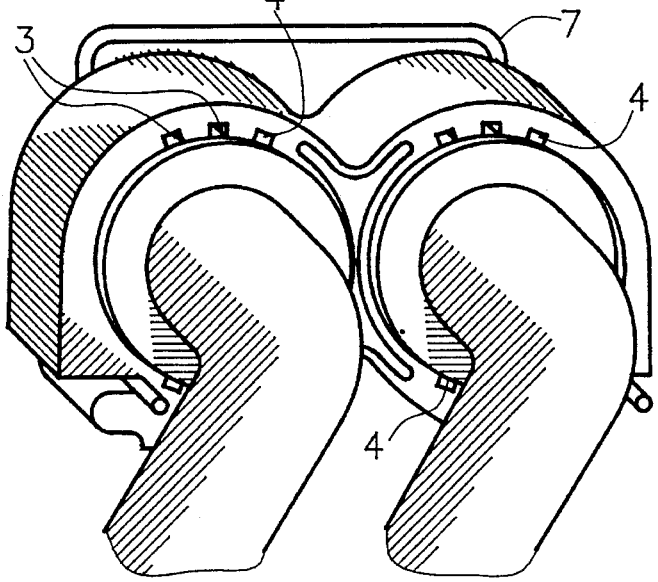
FIG. 13 is a view analogous to FIG. 12 showing the device assembled in a second configuration.

In FIGS. 12 and 13, there can be seen a plate 1 of FIG. 2 having two right angled endpieces 5 of FIG. 10 disposed therein. For example, each of the endpieces 5 may be connected to a water pipe in a cooling circuit for an internal combustion engine, with the tubular ducts 19 being connected to the inlet and the outlet of a heat exchanger (radiator or heater) of the vehicle.

In FIG. 12, the ribs 4 of the endpieces 5 are received in the middle grooves 3, thus corresponding to the axes 18 of the ducts 19 being disposed vertically.

In FIG. 13, the ribs 4 of the endpieces 5 are disposed in the grooves 3 that are adjacent in a clockwise direction to the middle grooves of the plate 1, as seen when looking towards the engine (not shown).

Figure 14:
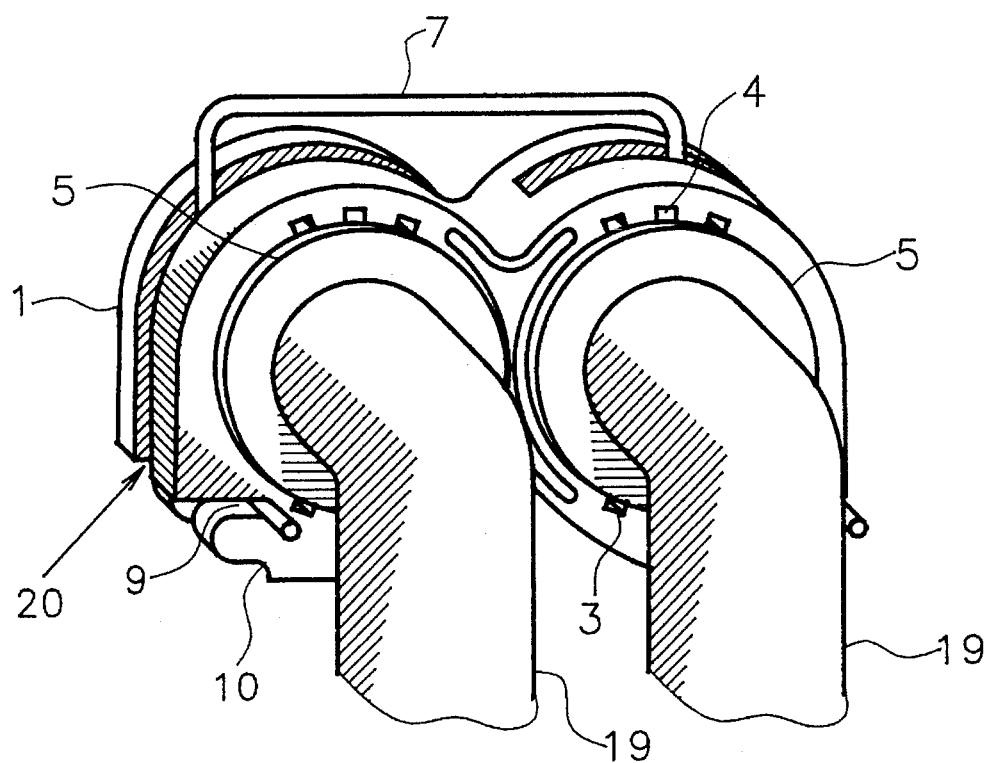
FIG. 14 is a perspective view of another embodiment of the device of the invention.
Figure 15:
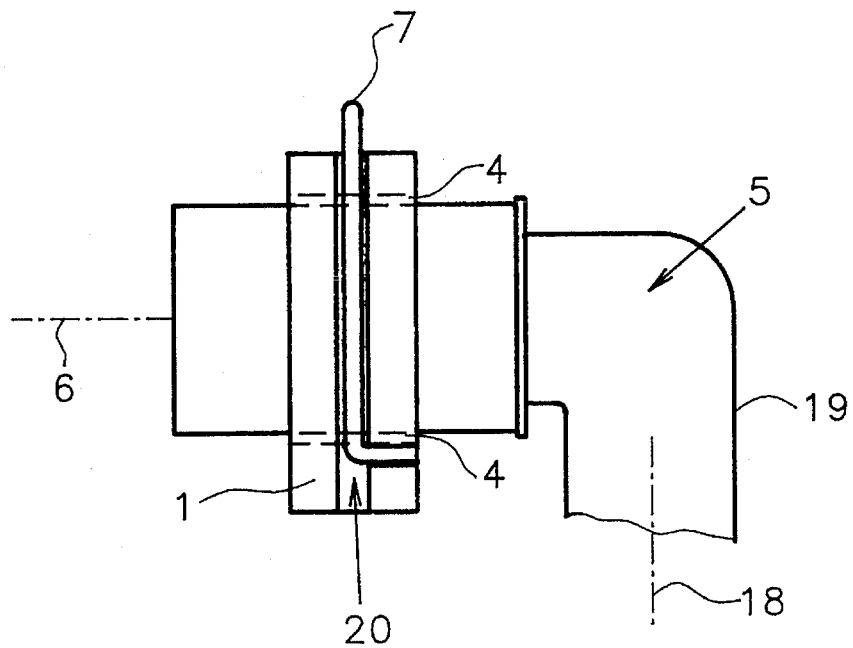
FIG. 15 is a side elevation view of the device of FIG. 14.

In FIGS. 14 and 15 there can be seen a preferred embodiment of the device of the present invention comprising single fixing means enabling the endpieces of an engine fluid circuit, in particular the endpieces of its water tank, to be assembled to the plate 1 and to the endpieces 5 of tubular ducts, in particular hoses.

Naturally, the material and the inside diameter of each of the tubular ducts used are compatible with proper operation of the engine, particularly with fluid flowing through circuits that remain fluid-tight over long periods of time of as much as or longer than 10 years. The materials used, and in particular the plastics material used must be capable of withstanding the fluid conveyed at the maximum acceptable temperatures and pressures. Naturally, the coupling device of the present invention includes suitable gaskets (not shown in the figures) for enabling the desired degree of sealing to be achieved.

The present invention is applicable to coupling various fluid circuits, in particular circuits associated with a vehicle internal combustion engine, for example the cooling circuit, the fuel feed circuit, and the oil circuit. Such circuits may optionally be associated with connectors for electrical cables or for optical fibers, and also with sheaths for mechanical control cables.

The present invention is mainly applicable to coupling water hoses of a water tank in a cooling circuit of a vehicle engine to a heat exchanger (radiator or heater).

I claim:

1. A coupling device for coupling tubular ducts to a fluid circuit of an internal combustion engine, comprising a tubular duct having an endpiece, said endpiece having an axis, and a coupling plate including at least one body having an opening formed therein to receive said endpiece of said tubular duct and first locking means for locking said endpiece against rotation about its axis in a plurality of predetermined orientations and second locking means for locking said endpiece against axial translation when it is coupled to the fluid circuit, wherein said second locking means is locked by axial translational movement of said tubular duct toward the fluid circuit of the internal combustion engine.

2. A coupling device according to claim 1, wherein the means for locking the endpiece against rotation about its axis in a plurality of predetermined orientations includes grooves for receiving a rib on the endpiece.

3. A coupling device according to claim 1, wherein said plate includes two openings for receiving two endpieces.

4. A coupling device according to claim 3, including flexible link means interconnecting the portions of the plate in which the openings for receiving respective endpieces are formed.

5. A coupling device according to claim 1, wherein said first locking means for locking an endpiece disposed in the opening comprises recesses or openings for receiving projections formed on the endpiece.

6. A coupling device according to claim 1, wherein said second locking means comprises a notch for receiving the ends of a pin for locking the coupling device.

7. A coupling device according to claim 1, including a single first locking means for simultaneously locking an endpiece of a tubular duct to an endpiece of an engine fluid circuit and to said plate.

8. A coupling device according to claim 7, wherein single first locking means comprises a pin associated with through openings.

9. A method of coupling a tubular duct to an endpiece of a fluid circuit of an internal combustion engine, including a step of inserting at least one endpiece having an axis and a tubular duct connected thereto and angled with respect to said axis into a reception opening of a plate at a desired predetermined orientation relative to said axis and simultaneously locking said endpiece to an endpiece of an engine fluid circuit and the plate with a pin cooperating with the plate opening by translation of the endpiece connected to the tubular duct toward the endpiece of the engine fluid circuit.

10. A method according to claim 9, including a prior step of determining the shape and the orientation of the endpiece connected to the tubular duct that are optimally adapted to the configuration of an engine, and a step comprising selecting the predetermined configuration that is the closest possible to said optimally adapted configuration.

\* \* \* \* \*